(12) United States Patent
He et al.

(10) Patent No.: US 8,400,330 B2
(45) Date of Patent: Mar. 19, 2013

(54) SYSTEM FOR DISPLAYING MULTIPLE OVERLAID IMAGES TO A PILOT OF AN AIRCRAFT DURING FLIGHT

(75) Inventors: Gang He, Morristown, NJ (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 338 days.

(21) Appl. No.: 12/911,386

(22) Filed: Oct. 25, 2010

(65) Prior Publication Data

US 2012/0056759 A1    Mar. 8, 2012

Related U.S. Application Data

(60) Provisional application No. 61/380,626, filed on Sep. 7, 2010.

(51) Int. Cl.
*G01C 23/00* (2006.01)
*G08B 21/00* (2006.01)

(52) U.S. Cl. ............................. 340/960; 340/973; 701/14

(58) Field of Classification Search .................. 340/960, 340/970, 973, 975, 980; 701/3, 14
See application file for complete search history.

(56) References Cited

U.S. PATENT DOCUMENTS

| | | | | |
|---|---|---|---|---|
| 5,798,713 A * | 8/1998 | Viebahn et al. | ............... | 340/973 |
| 6,061,068 A | 5/2000 | Hoffman, II et al. | | |
| 6,373,055 B1 | 4/2002 | Kerr | | |
| 7,109,889 B2 | 9/2006 | He | | |
| 7,196,329 B1 * | 3/2007 | Wood et al. | ................... | 250/330 |
| 7,295,901 B1 * | 11/2007 | Little et al. | ...................... | 701/16 |
| 7,605,774 B1 | 10/2009 | Brandt et al. | | |
| 2003/0132860 A1 * | 7/2003 | Feyereisen et al. | ........... | 340/973 |
| 2005/0232512 A1 | 10/2005 | Luk et al. | | |
| 2007/0179684 A1 | 8/2007 | He | | |
| 2007/0188350 A1 | 8/2007 | He et al. | | |
| 2009/0201177 A1 | 8/2009 | Soler | | |
| 2010/0125412 A1 | 5/2010 | Suddreth et al. | | |
| 2012/0035789 A1 * | 2/2012 | He | ................................. | 701/16 |
| 2012/0133529 A1 * | 5/2012 | He | ................................. | 340/978 |

* cited by examiner

*Primary Examiner* — John A Tweel, Jr.
(74) *Attorney, Agent, or Firm* — Ingrassia Fisher & Lorenz, P.C.

(57) ABSTRACT

A system for displaying first and second images to a pilot of an aircraft includes, but is not limited to, a sensor subsystem that detects a light transmission originating from outside the aircraft and generates a first signal indicative of the light transmission, a dynamic condition sensor that detects a dynamic condition of the aircraft and generates a second signal indicative of the dynamic condition of the aircraft, a display unit, and a processor that is communicatively coupled to the sensor subsystem and to the dynamic condition sensor and operatively coupled to the display unit. The processor is configured to command the display unit to display a first image corresponding to the first signal, to display a second image overlaid over the first image corresponding to the second signal, and to modify the appearance of the second image to enhance the pilot's ability to discern the first image.

25 Claims, 6 Drawing Sheets

SYSTEM FOR DISPLAYING MULTIPLE OVERLAID IMAGES TO A PILOT OF AN AIRCRAFT DURING FLIGHT

CROSS-REFERENCES TO RELATED APPLICATIONS

This application claims the benefit of U.S. Provisional Application No. 61/380,626, filed Sep. 7, 2010.

TECHNICAL FIELD

The technical field generally relates to aviation and more particularly relates to a system for displaying multiple overlaid images to a pilot of an aircraft during flight.

BACKGROUND

Aircraft are commonly equipped with one or more vision enhancing systems. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS"). An example of a synthetic vision system is disclosed in U.S. Pat. No. 7,352,292 which is hereby incorporated herein by reference in its entirety. Additionally, an exemplary synthetic vision system is available for sale in the market place under product name SmartView, manufactured by Honeywell Inc.

A typical SVS is configured to work in conjunction with a position determining unit associated with the aircraft as well as dynamic sensors that sense the aircraft's altitude, heading, and orientation. The SVS includes a database containing information relating to the topography along the aircraft's flight path. The SVS receives inputs from the position determining unit indicative of the aircraft's location and also receives inputs from the dynamic sensors on board the aircraft indicative of the aircraft's heading, altitude, and orientation. The SVS is configured to utilize the position, heading, altitude, and orientation information and the topographical information contained in its database, and generate a three-dimensional image that shows the topographical environment through which the aircraft is flying from the perspective of a person sitting in the cockpit of the aircraft. The three-dimensional image may be displayed to the pilot on any suitable display unit accessible to the pilot. Using a SVS, the pilot can look at the display screen to gain an understanding of the three-dimensional topographical environment through which the aircraft is flying and can also see what lies ahead. One advantage of the SVS is that its image is clean and is not obstructed by any weather phenomenon. One drawback of the SVS is its dependence upon the information contained in the database. If the database is not up to date, then the image presented to the pilot may not be an accurate depiction of the topographical environment around the aircraft.

Another example of a vision enhancing system is known as an enhanced vision system (hereinafter, "EVS"). Examples of enhanced vision systems are disclosed in U.S. Pat. Nos. 7,655,908 and 5,317,394 which are hereby incorporated herein by reference in their entirety. Additionally, an exemplary enhanced vision system is available for sale in the market place under product name EVS-II, manufactured by Kollsman, Inc. A typical EVS includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and typically located ahead of the aircraft in the aircraft's flight path. The light received by the EVS is used by the EVS to form an image that is then displayed to the pilot on any suitable display in the cockpit of the aircraft. The sensor used in an EVS is more sensitive to light than is the human eye. Accordingly, using the EVS, a pilot can view elements of the topography that are not visible to the human eye. For this reason, an EVS is very helpful to a pilot when attempting to land an aircraft in inclement weather or at night. One advantage to an EVS system is that it depicts what is actually present versus depicting what is recorded in a database.

Some aircraft are equipped with both an EVS and an SVS. In such aircraft, the images from the EVS and the SVS are commonly shown to the pilot on the same display screen, with the image from the EVS (which is smaller than the image from the SVS) being overlaid on top of the image from the SVS such that the portion of the SVS image located below the EVS image may not be visible.

In addition to the above described vision systems, additional images, in the form of symbology, are typically presented to the pilot on the same display screen where the images from the EVS in the SVS are displayed. The symbology commonly appears as an icon or a series of icons on the display screen and may be indicative of the aircraft's heading, direction, attitude, and orientation. Such symbology serves an important role in providing the pilot with situational awareness and controls concerning the orientation and attitude of the aircraft. This symbology is traditionally overlaid over the image presented by the SVS and EVS.

The information provided by the EVS and the symbology play an important role in enabling the pilot to maintain situational awareness during the flight and in particular approach and landing during low visibility conditions, and neither can be dispensed with. During certain portions of the flight such as determining whether to proceed with a landing or to initiate a go-around procedure, the information provided by the EVS may have greater importance to the pilot than the information provided by the symbology. However, because the symbology is a relatively strong computer-generated image and because the EVS image is a relatively weak image compared to that of background, which is based on relatively weak light transmissions detected during lowlight or inclement weather conditions, the symbology may obscure, overpower, or blank out the EVS image or the critical signatures within an EVS image. Additionally, during other phases of the flight, the information provided by the SVS may be quite important to pilot and the overlaying of symbology over the SVS image may cause an undesirable amount of obscuring and cluttering of the SVS image.

BRIEF SUMMARY

Systems and methods for displaying multiple overlaid images to a pilot of an aircraft during flight are disclosed herein.

In an embodiment, the system includes, but is not limited to, a sensor subsystem that is configured to detect a light transmission originating from an exterior of the aircraft and to generate a first signal indicative of the light transmission. The system further includes a dynamic condition sensor that is configured to detect a dynamic condition of the aircraft and to generate a second signal indicative of the dynamic condition of the aircraft. The system further includes a display unit having a display screen. The system still further includes a processor that is communicatively coupled to the sensor subsystem and to the dynamic condition sensor and that is operatively coupled to the display unit. The processor is configured to obtain the first signal and the second signal, to command the display unit to display the first image on the display screen corresponding to the first signal, to command the display unit to display the second image overlaid over the first image, the second image corresponding to the second signal, and to command the display unit to modify an appearance of the second image to enhance an ability to discern the first image.

In another embodiment, the system includes, but is not limited to, a sensor subsystem that is configured to detect a light transmission originating from an exterior of the aircraft and to generate a first signal indicative of the light transmission. The system further includes a dynamic condition sensor that is configured to detect a dynamic condition of the aircraft and to generate a second signal indicative of the dynamic condition of the aircraft. The system further includes a synthetic vision subsystem that is configured to generate a third signal indicative a topographical environment proximate the aircraft. The system further includes a display unit having a display screen. The system still further includes a processor communicatively coupled to the sensor subsystem, to the dynamic condition sensor, to the synthetic vision subsystem, and operatively coupled to the display unit. The processor is configured to obtain the first signal, the second signal, and the third signal, to command the display unit to display the third image on the display screen corresponding to the third signal, to command the display unit to display the first image corresponding to the first signal on the display screen in a manner that obscures a portion of the third image, to command the display unit to display the second image overlaid over the first image, the second image corresponding to the second signal, and to command the display unit to modify an appearance of the second image to enhance an ability to discern the first image.

In another embodiment the method includes, but is not limited to, the steps of receiving a light transmission originating from an exterior of the aircraft with a sensor system, sensing a dynamic condition of the aircraft with a dynamic condition sensor, displaying the first image corresponding with the light transmission on a display screen, overlaying the second image corresponding with the dynamic condition of the aircraft on top of the first image, and modifying the second image in a manner that enhances a pilot's ability to discern the first image.

In another embodiment, the system includes, but is not limited to, a synthetic vision subsystem that is configured to generate a first signal indicative a topographical environment proximate the aircraft. The system also includes a dynamic condition sensor that is configured to detect a dynamic condition of the aircraft and to generate a second signal that is indicative of the dynamic condition of the aircraft. The system also includes a display unit having a display screen. The system still further includes a processor that is communicatively coupled to the synthetic vision subsystem, to the dynamic condition sensor, and that is operatively coupled to the display unit. The processor is configured to obtain the first signal and the second signal, to command the display unit to display the first image on the display screen corresponding to the first signal, to command the display unit to display the second image overlaid over the first image, the second image corresponding to the second signal, and to command the display unit to modify an appearance of the second image to enhance an ability to discern the first image.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or the following detailed description.

An improved system for displaying multiple overlaid images to a pilot of an aircraft during flight is disclosed herein. Using the system disclosed herein, images generated by an EVS or an SVS can be presented to a pilot together with symbology generated by dynamic condition sensors in a manner that permits the pilot to discern the image generated by the EVS or the SVS without compromising the symbology's ability to convey the aircraft's dynamic condition. The system is configured to blank out portions of the symbology, render portions of the symbology partially transparent, reduce the brightness of the symbology, and otherwise display the symbology in a manner that is less likely to obscure the image generated by the EVS and/or the SVS. By de-conflicting the symbology and the image generated by the EVS and/or the SVS, the system enables the pilot to freely receive information provided by the EVS, the SVS, and the dynamic condition sensor.

A greater understanding of the embodiments of the systems and methods for displaying multiple overlaid images to a pilot that are disclosed herein may be obtained through a review of the illustrations accompanying this application together with a review of the detailed description that follows.

Figure 1:
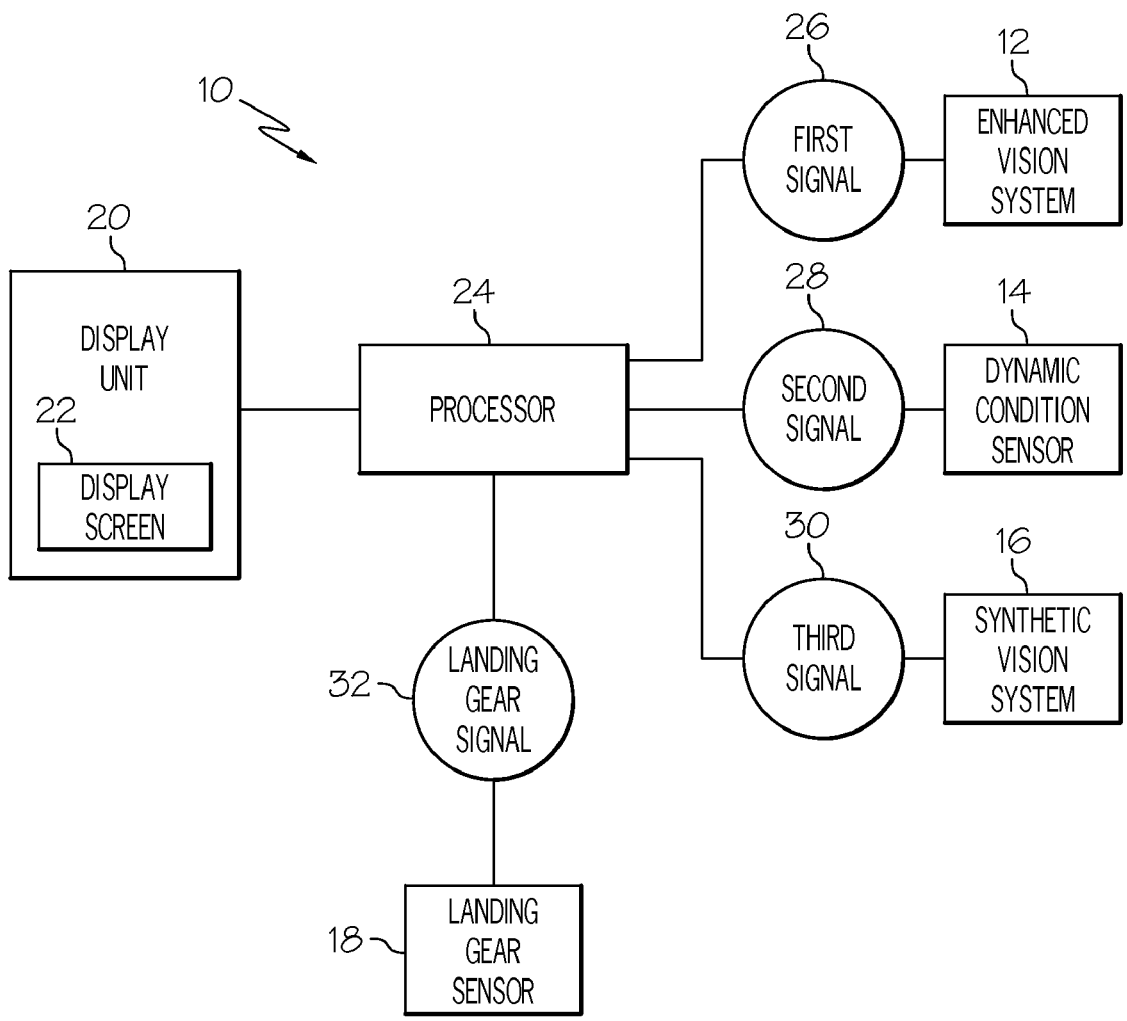
FIG. 1 is a schematic view illustrating a system for displaying multiple overlaid images to a pilot of an aircraft during flight.

FIG. 1 is a schematic view illustrating a system 10 for displaying multiple overlaid images to a pilot of an aircraft during flight. System 10 includes multiple components each of which may be configured for mounting to aircraft. In some embodiments, system 10 may be a self-contained system such that each of the components described below are contained in a single housing and are dedicated exclusively to serving the functions of system 10 while in other embodiments, the various components described below may be standalone components or they maybe components that are used as part of other systems and which are configured to be used as a shared resource between such other systems and system 10.

In the embodiment illustrated in FIG. 1, system 10 includes an enhanced vision system 12 ("EVS 12"), a dynamic condition sensor 14, a synthetic vision system 16 ("SVS 16") a landing gear sensor 18, a display unit 20, display screen 22, and a processor 24. In other embodiments, system 10 may include either additional or fewer components. For example, in some embodiments, system 10 may not include SVS 16 or landing gear sensor 18, while in other embodiments, system 10 may include a position determining unit (such as a GPS system or an inertial navigation system) and/or a pilot input device.

EVS 12, as described in the background section above, includes one or more sensors adapted for mounting to an aircraft and configured to detect a light signature originating from outside the aircraft. The sensor may include a visible low light television camera, an infrared camera, or any other light sensing device capable of detecting light either within, or outside of the visible spectrum. The light signature may include any light that is projected from, or that is reflected off of any terrain or object outside of the aircraft. In one application, the light signature includes, but is not limited to, lights that are positioned adjacent opposite sides of a runway and which are pointed towards the anticipated flight path of an aircraft on approach to the runway.

EVS 12 is configured to generate a first signal 26 and to provide first signal 26 to processor 24. First signal 26 is an electronic signal that includes information corresponding to the light signature detected by EVS 12 and which would enable processor 24 to render an image of the light signature (referred to hereinafter as "the EVS image"). For example, if the detected light signature is of a distant runway and runway lights adjacent to the runway, first signal 26 would enable processor 24 to render an image of the distant runway and the adjacent runway lights. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case first signal 26 would comprise unprocessed inputs from the light detecting sensors of EVS 12.

Dynamic condition sensor 14 is a sensor that is adapted to be mounted to the aircraft and that is configured to detect a dynamic condition of the aircraft. As used herein, the term "dynamic condition" refers to one or more of the following: the aircraft's heading, altitude, roll, pitch, and yaw. Examples of components that may be used as dynamic condition sensor 14 include, but are not limited to, gyroscopes, altimeters, and pitot tubes.

Dynamic condition sensor 14 is configured to generate a second signal 28 and to provide second signal 28 to processor 24. Second signal 28 is an electronic signal that includes information corresponding to the dynamic condition detected by dynamic condition sensor 14 and which would enable processor 24 to render an image corresponding to the dynamic condition (referred to hereinafter as either "the dynamic condition sensor image" or "symbology"). For example, second signal 28 includes information that will permit processor 24 to render an image, such as, but not limited to, symbology that is indicative of the dynamic conditions experienced by the aircraft.

SVS 16, as described in the background section above, is configured to generate a three-dimensional image of the topographical environment around the aircraft (referred to hereinafter as "the SVS image"). In some embodiments, SVS 16 may include a data storage device (not shown) containing data relating to the topography which may include either or both landscape and/or man-made structures located along the aircraft's flight path. In some embodiments, the data storage device may contain such data for an entire geographical region such as a state, a country or continent. SVS 16 may also include a position determining unit that is configured to determine the position of the aircraft with respect to the surface of the earth. Such a position determining unit may include, but is not limited to, a GPS system, an inertial navigation system, and the like. SVS 16 may also be configured to receive inputs from dynamic condition sensor 14 relating to the aircraft's heading, altitude and attitude.

In some embodiments, SVS 16 may include a dedicated processor, microprocessor, or other circuitry that is configured to take the information pertaining to the position, attitude, altitude and heading of the aircraft and to utilize the information available in the database to generate a third signal 30 that may be utilized by processor 24 to render a three-dimensional image of the topographical environment through which the aircraft is flying. In other embodiments, SVS 16 may not include a dedicated processor, microprocessor or other circuitry. In such embodiments, third signal 30 would contain the unprocessed sensor information and location data which could then be utilized by processor 24 to render the three dimensional image of the topographical environment. In either event, SVS 16 is configured to provide third signal 30 to processor 24.

Landing gear sensor 18 may be any suitable sensor that is connected to, or otherwise associated with the aircraft's landing gear and that is configured to detect whether the landing gear is raised or lowered. Landing gear sensor 18 is configured to generate landing gear signal 32 and to provide landing gear signal 32 to processor 24 when it detects that the landing gear has been lowered.

Display unit 20 may be any type of display device that generates visual output using any one of a number of different technologies. For example, display unit 20 may be a Cathode Ray Tube (CRT) display device, a flat panel display device, a Liquid Crystal Display (LCD) device, a plasma display device, an electro-luminescent display device, a Light Emitting Diode (LED) display device, a holographic display device, a Head Up Display (HUD), a Micro Mirror Device (MMD) display device, a near-to-eye display or the like.

Additionally, display unit 20 includes a display screen 22 that is operatively connected to display unit 20. Display screen 22 is configured to be controlled by display unit 20 and may be used to display any type of image including, but not limited to, graphics and text. In some embodiments, display unit 20 may include multiple display screens 22 and system 10 may include multiple display units 20.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of SVS 16 or of EVS 12.

Processor 24 is communicatively coupled to EVS 12, dynamic condition sensor 14, SVS 16, and landing gear sensor 18 and is operatively coupled to display unit 20. Such communicative and operative connections may be effected through the use of any suitable means of transmission including both wired and wireless connections. For example, each component may be physically connected to processor 24 via a coaxial cable or via any other type of wire connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, dynamic condition sensor 14, SVS 16, landing gear sensor 18, and display unit 20, provides processor 24 with a pathway for the receipt and transmission of signals, commands, instructions, and interrogations to and from and each of the other components. Processor 24 is configured (i.e. being loaded with and being capable of executing suitable computer code, software and/or applications) to interact with and to coordinate with each of the other components of system 10 for the purpose of overlaying images corresponding to first signal 26, second signal 28, and third signal 30. For example, in the illustrated embodiment, processor 24 is configured to receive third signal 30 from SVS 16 and to send a command to display unit 20 instructing display unit 20 to display the SVS image on a display screen 22.

Processor 24 is also configured to receive first signal 26 from EVS 12 and to send a command to display unit 20 instructing display unit 20 to display the EVS image on display screen 22. Processor 24 is further configured to command display unit 20 to overlay the EVS image on top of the SVS image. Furthermore, because the EVS image is reflective of what is actually present along the aircraft's flight path, processor 24 may give precedence to the EVS image and may command display unit 20 to obscure the portion of the SVS image lying beneath the EVS image.

Processor 24 is also configured to receive second signal 28 from dynamic condition sensor 14 and to send a command to display unit 20 to display one or more images on display screen 22 that correspond with the dynamic condition of the aircraft (referred to hereinafter as either "the dynamic condition image" or as "symbology"). Processor 24 may command display unit 20 to display the symbology on top of both the SVS image and the EVS image.

Upon the occurrence of a triggering event, processor 24 is further configured to modify the symbology to ensure that the EVS image is discernible by a pilot despite being displayed beneath the symbology. In some embodiments, the triggering event may be when the aircraft begins its approach to a runway. The beginning of the approach phase of a flight may be determined based on the receipt by processor 24 of the landing gear signal 32. In other embodiments, the beginning of the approach phase of a flight may be determined based on the aircraft's proximity to the runway or height above the ground. The aircraft's proximity to the runway may be derived from the position information included in third signal 30 or from position information provided by a separate position determining unit mounted to the aircraft. In other embodiments, the triggering event may be when an input is received by processor 24 from the pilot or some other member of the aircrew.

Once the triggering event occurs, processor 24 is configured to send additional commands to display unit 20 instructing display unit 20 to either block out portions of the symbology, to render portions of the symbology transparent, and/or diminish the brightness of portions of the symbology. Other techniques may also be employed without the parting from the teachings of the present disclosure. In some embodiments, all symbology on display screen 22 will be modified while in other embodiments, only the symbology overlying the EVS image will be modified.

Figure 2:
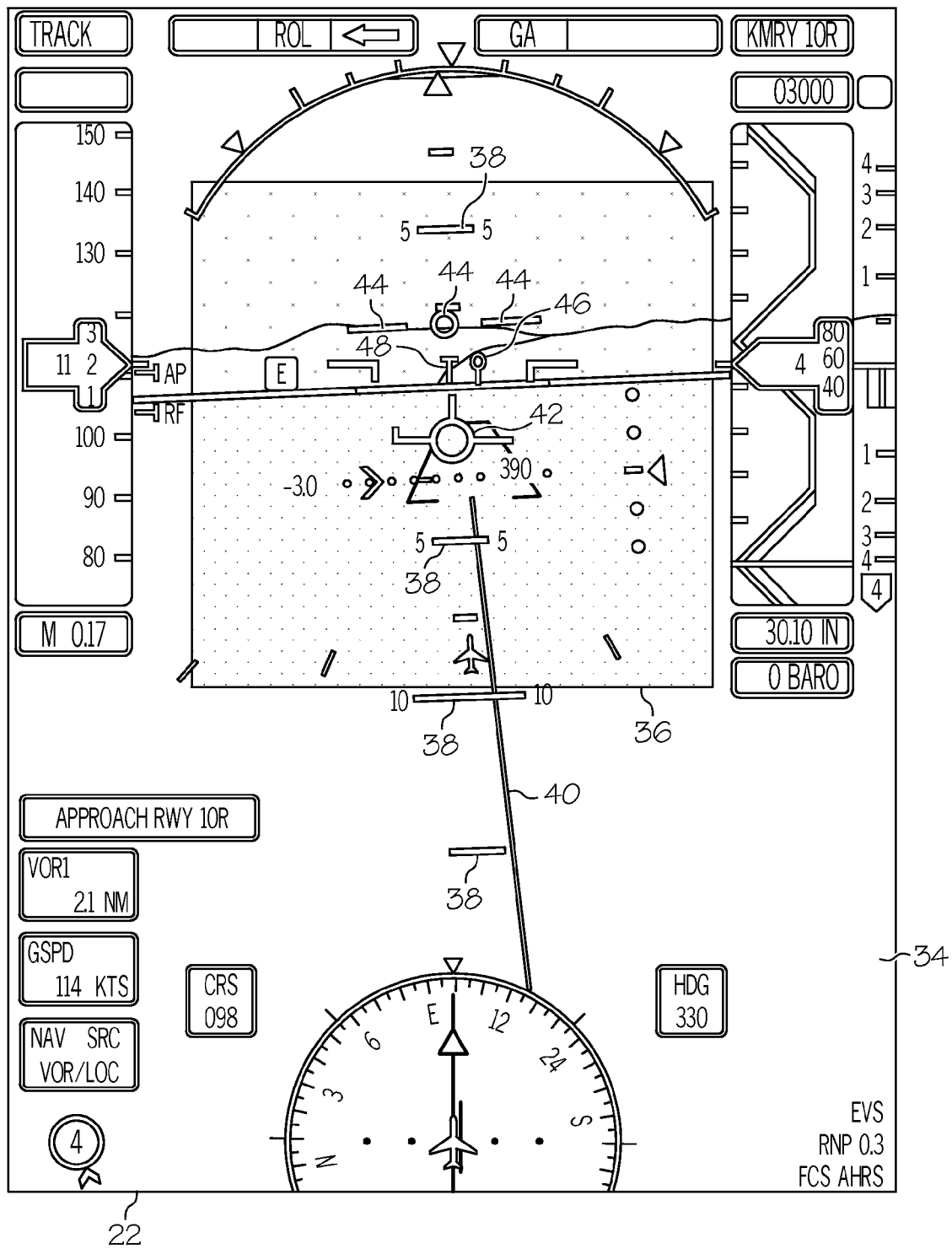
FIG. 2 is a representation of a display screen illustrating multiple overlaid images using the system of FIG. 1 prior to modification of symbology generated by one or more dynamic condition sensors onboard the aircraft.

FIG. 2 is a representation of display screen 22 illustrating multiple overlaid images using system 10 prior to modification of the symbology. The images displayed on display screen 22 include an SVS image 34, an EVS image 36, and multiple dynamic condition images including a pitch ladder 38, a ground track or approach course line 40 going into approach runway position, a flight path marker 42, a flight director 44, a heading indicator 46, and a track indicator 48. Pitch ladder 38 comprises a series of short horizontal lines bordered on opposite sides by number that is indicative of the aircraft's pitch angle. The pitch ladder 38 extends vertically across a majority of display screen 22 and is overlaid on top of EVS image 36. Approach course line 40 is a relatively thin solid line that provides a pilot with a visual indication of the aircraft's ground track. A portion of approach course line 40 is overlaid on top of EVS image 36. Flight path marker 42 is a symbol that represents where the aircraft is currently moving to. It comprises a circular portion and three lines extending therefrom representing the wings and tail fin of an aircraft. Flight path marker 42 provides a pilot with a visual indication of where the aircraft is actually headed with respect to SVS image 34 and EVS image 36. As illustrated, flight path marker 42 is overlaid onto EVS image 36. Flight director 44 is similar to flight path marker 42 and includes a circular portion and two short line segments, one each on opposite sides of the circular portion. Flight director 44 provides a visual representation to the pilot of flight control system command for aircraft attitude adjustment. The pilot may then provide control inputs into the aircraft's control systems to bring flight path marker 42 into alignment with flight director 44. As illustrated, flight director 44 is overlaid onto EVS image 36. Heading indicator 46 and track indicator 48 provide a pilot with a visual indication of the current heading of the aircraft and the current track that the aircraft is following (the track will differ from the heading because of environmental factors such as, but not limited to, wind). Heading indicator 46 and track indicator 48 of overlaid onto EVS image 36.

With continuing reference to FIGS. 1 and 2, FIG. 2 illustrates how the presence of symbology overlaid on top of EVS image 36 can adversely impact EVS image 36. First signal 26 is oftentimes a weak signal in the sense that the signature to be identified has very low contrast with respect to the background image because of weather conditions that may obscure the ability of EVS 12 to obtain a strong light signature or because of the distance of the aircraft from the light signature or for a variety of other factors. When first signal 26 is weak, the image corresponding to first signal 26 is easily overpowered and washed out. The presence of symbology overlaid on top of EVS image 36 will therefore sometimes cause EVS image 36 to become washed out and make it difficult to perceive the weak signatures contained in the image This is illustrated in FIG. 2 where no runway or other terrain features are discernible in EVS image 36, where the faint approach light signatures (near the pitch ladder 5 degree line in FIG. 2) are very weak and can be easily overwhelmed by the pitch ladder symbology. As a result, a pilot may not be able to see the approach light signature in time to continue the approach.

Figure 3:
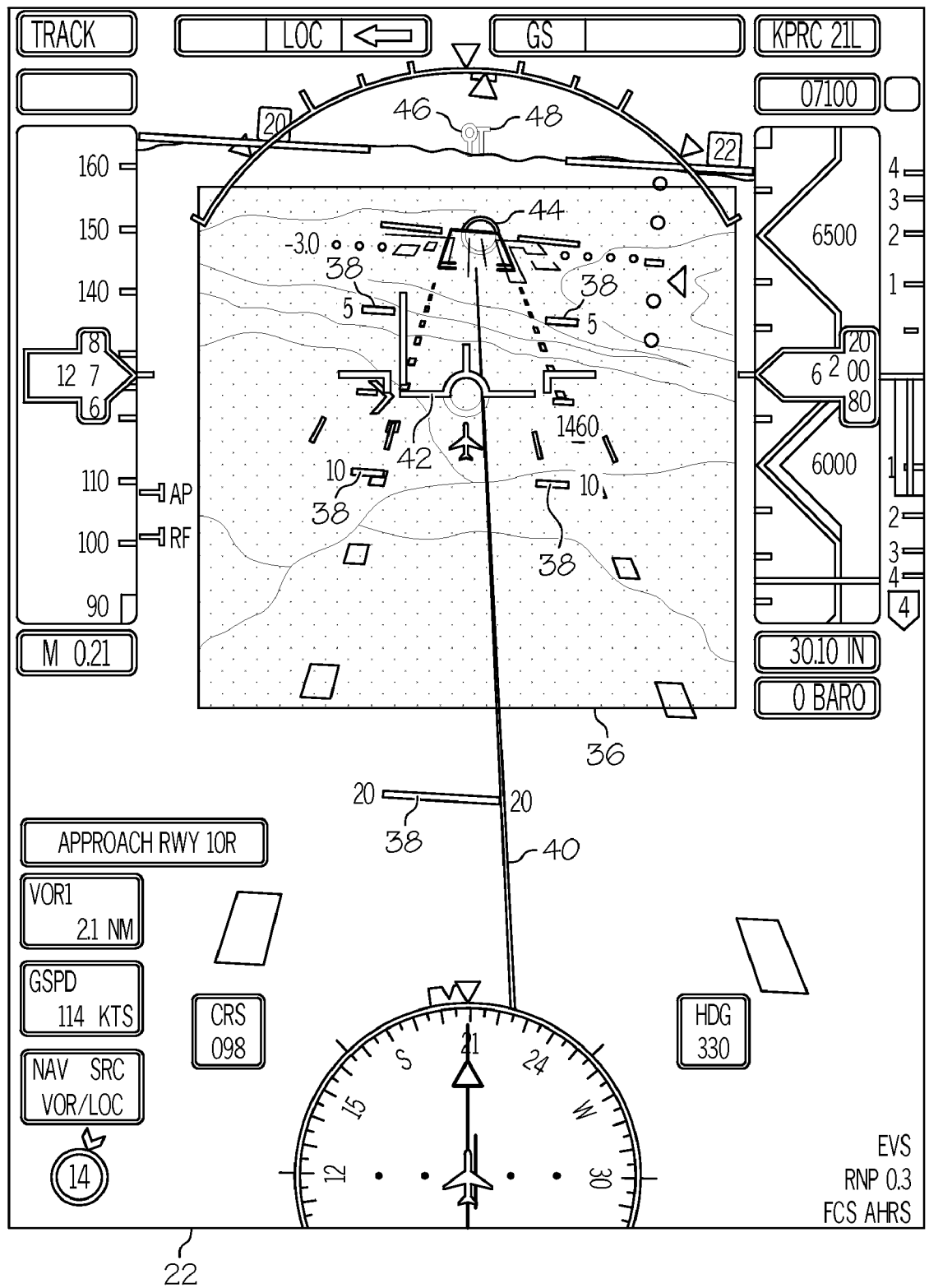
FIG. 3 is a representation of the display screen of FIG. 2 after modification of the symbology.

FIG. 3 is a representation of display screen 22 after modification of the symbology. As illustrated, the portions of the symbology that are located outside of EVS image 36 are unaffected. For instance, the portions of pitch ladder 38 and of approach course line 40 that are located below EVS image 36 have the same level of clarity and intensity as they had before modification. It is only those portions of the symbology that overlie EVS image 36 are modified. As illustrated, the middle portions of the horizontal lines of pitch ladder 38 are blanked out, leaving only the numbers corresponding to the aircraft's pitch and small segments of the horizontal lines. Approach course line 40 is illustrated as tapering off and with diminished intensity. The bottom portion of flight path marker 42 is rendered in a semi-transparent manner such that portions of EVS image 36 located beneath the bottom portion can be seen through flight path marker 42. Similarly, the bottom portion of flight director 44 has also been rendered in a semi-transparent manner. Additionally, heading indicator 46 and track indicator 48 have been rendered with diminished intensity.

It should be understood that the modifications described above are exemplary and do not comprise an exhaustive list of techniques that may be employed by processor 24 to enhance the discernibility of EVS image 36. Furthermore, in this example, the modification is performed to a portion of the symbology display that appears near the center portion of display screen 22 which is where the approach runway signature is displayed. It should be understood that the approach runway signature may appear at positions other than the center of display screen 22 or at positions other than the center of EVS image 36. When the approach runway signature is displayed off-center, the symbology modifications can be performed at off-center locations that correspond with the off-center location of the approach runway signature. This ensures a better view of the image signatures while maintaining clarity of symbology display in other areas for aircraft controls. The location can be estimated by using the current aircraft position, orientation, attitude information with the location information of the approach runway to determine the approximate area that the runway signature may appear on the image and display. Furthermore, any of these techniques may be used on any of the symbology described above or on any other symbology overlaid over EVS image 36.

With continuing reference to FIGS. 1-3, as a result of as a result of the modification described above, the image generated by EVS 12 can now be seen. As illustrated in FIG. 3, EVS image 36 now shows the specific features of the topographical environment through which the aircraft is flying. Terrain, mountain ranges, and man-made structures such as a runway are all clearly visible after modification of the symbology. These features were not visible in FIG. 2 because of the obscuring impact of the symbology on EVS image 36.

As discussed above, the modification of the symbology may be triggered by a triggering event such as reaching a predetermined distance from the runway or the lowering of landing gear. In some embodiments, an input device may be provided that permits a pilot to selectively modify the symbology. This would allow a pilot to modify the symbology during portions of the flight where such symbology would not be automatically modified and also to resume an unmodified rendering of the symbology during the portion of the flight where such symbology would automatically be modified. Such an embodiment could be effected by including an on/off switch with system 10, communicatively coupling such on/off switch to processor 24, and configuring processor 24 to send commands to modify or to not modify the symbology in accordance with the input provided by the pilot.

Figure 4:
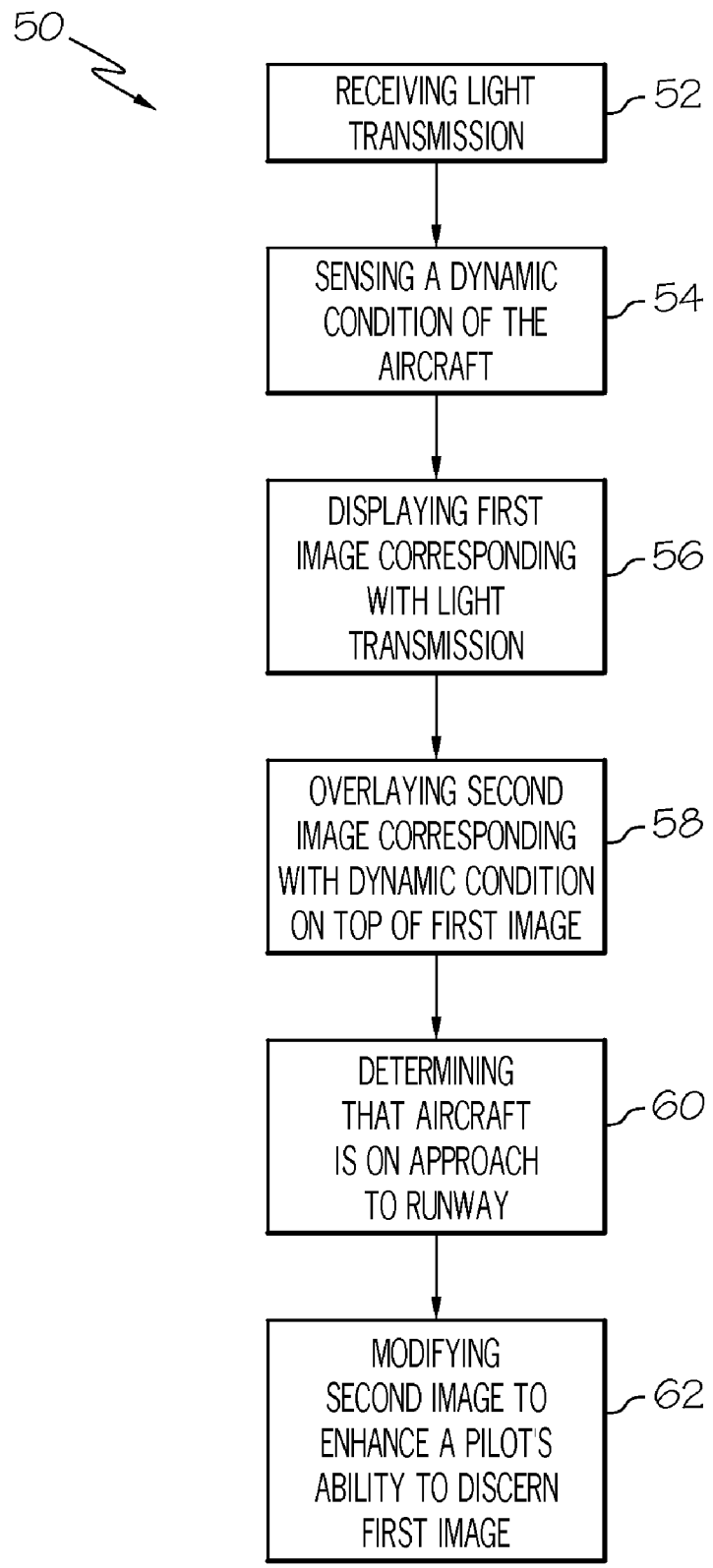
FIG. 4 is a flow diagram illustrating a method for displaying multiple overlaid images to a pilot of an aircraft during flight.

FIG. 4 is a flow diagram illustrating a method 50 for displaying multiple overlaid images to a pilot of an aircraft during flight. At block 52, a light transmission is received from a source external to an aircraft. In one example, the light transmission may be light received from runway lights that are projecting their beams up into the flight path of the aircraft. In another example, the light transmission may be light reflecting off of an object or a portion of the terrain or a man-made object disposed in the aircraft's flight path. The light transmission may be received by any suitable sensor including, but not limited to, a lowlight television camera or an infrared camera.

At block 54, a dynamic condition of the aircraft is sensed. Such dynamic condition may relate to the aircraft's altitude, heading, velocity, roll, pitch, yaw, and any other condition corresponding with motion of the aircraft. The dynamic condition may be detected through the use of a radar altimeter, a pitot tube, an inertial navigation system, a gyroscope, any other device configured to detect motion, attitude, and/or changes in motion or attitude, as well as any combination of such devices.

At block 56, a first image that corresponds with the light transmission is displayed on a display screen. Such image may fill the entire display screen or may occupy only a small portion of the display screen, as desired. Accordingly, if the light transmission includes light reflected from a distant runway, light projected by runway lights, and light reflected from terrain in the vicinity of the runway, then the first image would be of the runway, the runway lights, and the nearby terrain.

At block 58, a second image corresponding with the dynamic condition is overlaid on top of the first image. The second image may include one or more pieces of symbology that convey information to the pilot about the dynamic condition of the aircraft.

At block 60, the aircraft begins its approach to the runway. The beginning of the approach phase of a flight may be detected in multiple ways. In some examples, systems onboard the aircraft that are configured to detect the location of the aircraft may determine that the aircraft has approached to within a predetermined distance from the runway. In other examples, a sensor may detect when the aircraft lowers its landing gear. In still other embodiments, any other method or system for detecting when the aircraft is on approach to a runway may also be used without departing from the teachings of the present disclosure.

At block 62, once it has been determined that the aircraft is on approach to the runway, the second image is modified in a manner that enhances the pilot's ability to discern the first image. This may include blanking out portions of the second image, rendering portions of the second image at least partially transparent, diminishing the intensity of the second image, or using any other method that would enhance the pilot's ability to discern the first image.

Figure 5:
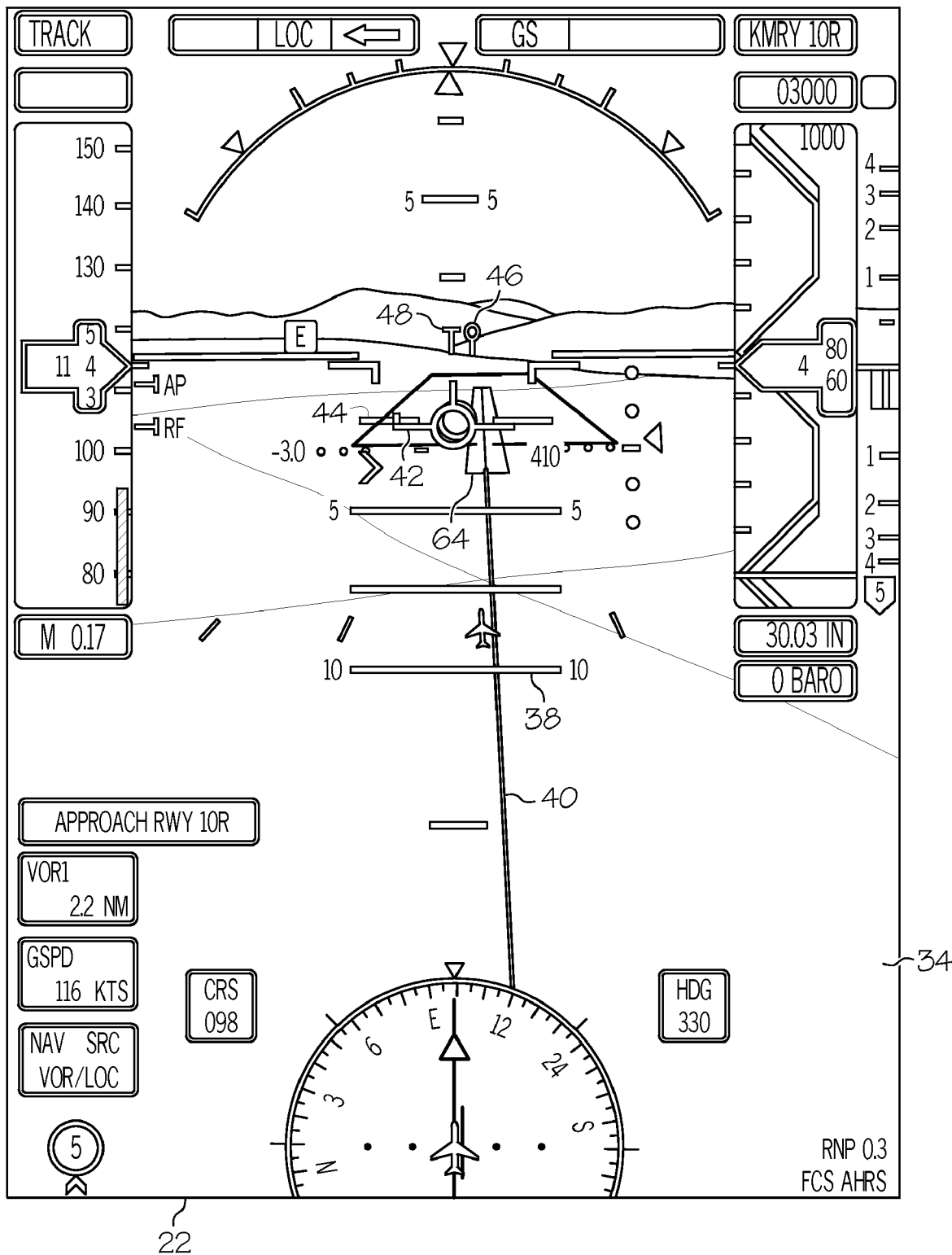
FIG. 5 is another representation of a display screen illustrating multiple overlaid images using the system of FIG. 1 prior to modification of symbology generated by one or more dynamic condition sensors onboard the aircraft.

FIG. 5 is another representation of a display screen illustrating multiple overlaid images using the system of FIG. 1 prior to modification of symbology generated by one or more dynamic condition sensors onboard the aircraft. With continuing reference to FIGS. 1-5, FIG. 5 illustrates images that are presented to a pilot by system 10. As illustrated in FIG. 5, system 10 may be configured to present SVS image 16 and symbology to a pilot, but to omit EVS image 36. Such a configuration may be beneficial to a pilot at various phases of flight including, but not limited to, taxiing the aircraft prior to take off and subsequent to landing and also during any airborne phase of the flight.

As illustrated in FIG. 5, various items of symbology are overlaid on top of SVS image 34. For example, pitch ladder line 38, approached coarse line 40, flight path marker 42, flight director 44, heading indicator 46, and track indicator 48 are each superimposed over SVS image 34.

One feature depicted in SVS image 34 is a runway 64. Runway 64 is generated by system 10 via the use of location information and dynamic condition information provided by various sensors onboard the aircraft as well as via the use of electronic data pertaining to terrain features and man-made structures stored in synthetic vision systems 16. Runway 64 and the terrain leading up to and just beyond runway 64 are partially extracted from view by the symbology that has been overlaid onto SVS image 34. Because a pilot may wish to have a clearer are less cluttered view of runway 64 and the terrain surrounding runway 64, system 10 may be configured to permit the pilot to modify the symbology to reduce any visual interference that might occur without modification.

Figure 6:
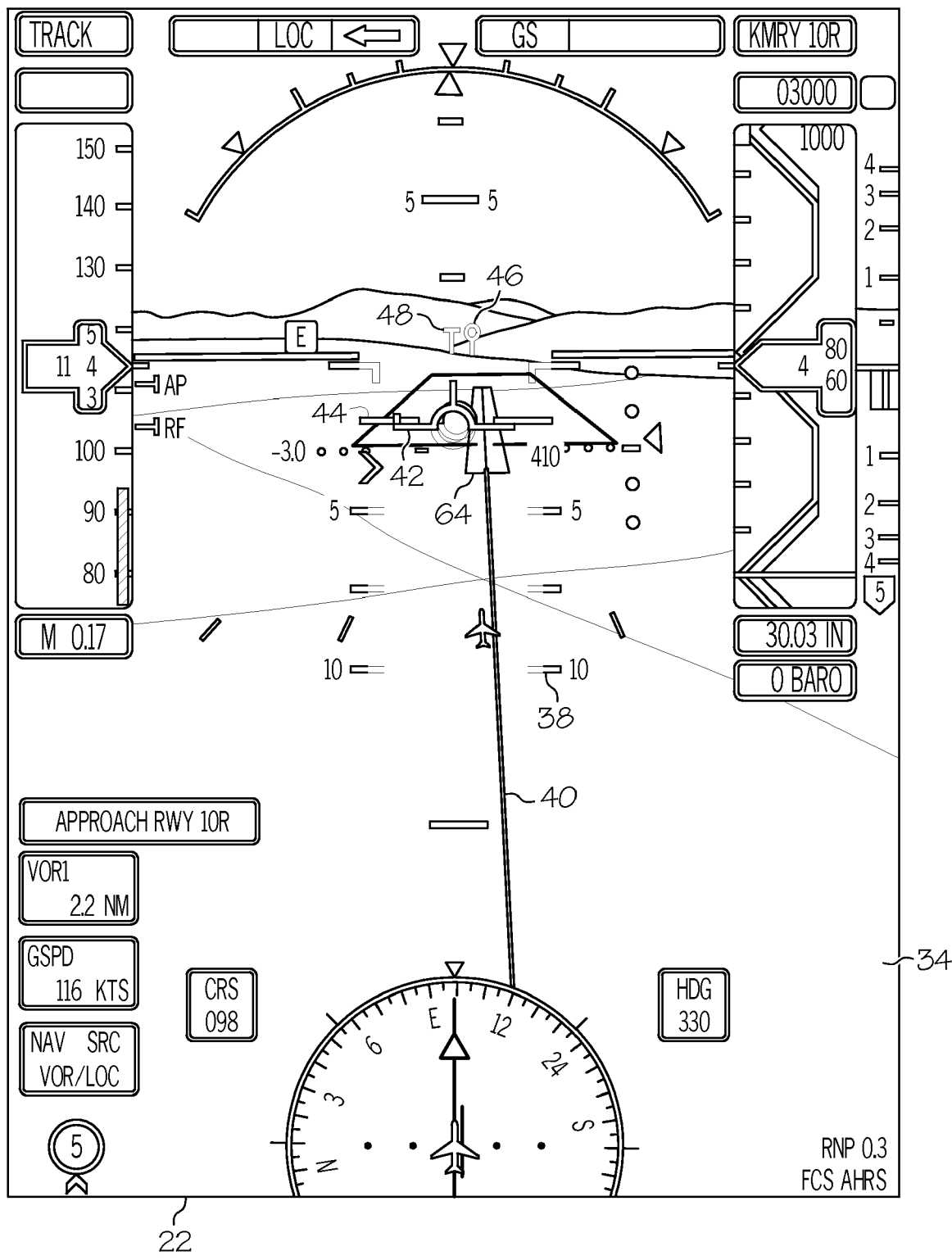
FIG. 6 is a representation of the display screen of FIG. 5 after modification of the symbology.

In FIG. 6 is a representation of the display screen of FIG. 5 after modification of the symbology. As illustrated, various features of the symbology have been modified. For example, the central portions of the lines of pitch ladder 38 have been blanked out, portions of flight path marker 42 and flight director 44 have been rendered partially transparent, and heading indicator 46 and track indicator 48 have been rendered with diminished intensity. The modification of these items of symbology make it easier for a pilot to view the terrain features, such as runway 46, rendered as part of SVS image 34.

Although the foregoing discussion focuses primarily on the modification of images during the approach phase of a flight, it should be understood that such modification may occur at other phases of the flight as well. For example, the system described herein may be configured to modify the symbology during periods when the aircraft is taxiing to or from the runway. It may be desirable to modify the symbology to permit a pilot to more clearly see a taxi-way center line, taxi-way edge lights, and taxi-way center lights using the EVS system. It may also be desirable to modify the symbology during periods when the aircraft is flying at cruise altitude to assist the pilot in establishing visual contact with other airborne objects.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying a first image and a second image to a pilot of an aircraft during flight, the system comprising:
    a sensor subsystem configured to detect a light transmission originating from an exterior of the aircraft and to generate a first signal indicative of the light transmission;
    a dynamic condition sensor configured to detect a dynamic condition of the aircraft and to generate a second signal indicative of the dynamic condition of the aircraft;
    a display unit having a display screen; and
    a processor communicatively coupled to the sensor subsystem and to the dynamic condition sensor and operatively coupled to the display unit, the processor configured to:
    obtain the first signal and the second signal,
    command the display unit to display the first image on the display screen corresponding to the first signal,
    command the display unit to display the second image overlaid over the first image, the second image corresponding to the second signal, and
    command the display unit to modify an appearance of the second image to enhance an ability to discern the first image.

2. The system of claim 1, wherein the sensor subsystem comprises an enhanced vision system.

3. The system of claim 1, wherein the second image comprises symbology.

4. The system of claim 1, wherein the processor is configured to modify the second image when the aircraft begins an approach to a runway.

5. The system of claim 4, further comprising a landing gear sensor configured to generate a landing gear signal when a landing gear is lowered, wherein the processor is communicatively coupled to the landing gear sensor and configured to obtain the landing gear signal from the landing gear sensor and further configured to command the display unit to modify the appearance of the second image when the landing gear signal is obtained.

6. The system of claim 1, wherein the processor is configured to command the display unit to blank out at least a portion of the second image.

7. The system of claim 1, wherein the processor is configured to command the display unit to render at least a portion of the second image at least partially transparent.

8. The system of claim 1, wherein the processor is configured to command the display unit to diminish a brightness of at least a portion of the second image.

9. A system for displaying a first image a second image, and a third image to a pilot of an aircraft during flight, the system comprising:
    a sensor subsystem configured to detect a light transmission originating from an exterior of the aircraft and to generate a first signal indicative of the light transmission;
    a dynamic condition sensor configured to detect a dynamic condition of the aircraft and to generate a second signal indicative of the dynamic condition of the aircraft;
    a synthetic vision subsystem configured to generate a third signal indicative a topographical environment proximate the aircraft;
    a display unit having a display screen; and
    a processor communicatively coupled to the sensor subsystem, to the dynamic condition sensor, to the synthetic vision subsystem, and operatively coupled to the display unit, the processor configured to:
    obtain the first signal, the second signal, and the third signal,
    command the display unit to display the third image on the display screen corresponding to the third signal,
    command the display unit to display the first image corresponding to the first signal on the display screen in a manner that obscures a portion of the third image,
    command the display unit to display the second image overlaid over the first image, the second image corresponding to the second signal, and
    command the display unit to modify an appearance of the second image to enhance an ability to discern the first image.

10. The system of claim 9, wherein the sensor subsystem comprises an enhanced vision system.

11. The system of claim 9, wherein the second image comprises symbology.

12. The system of claim 9, wherein the processor configured to modify the second image automatically when the aircraft begins an approach to a runway.

13. The system of claim 12, further comprising a landing gear sensor configured to generate a landing gear signal when a landing gear is lowered, wherein the processor is communicatively coupled to the landing gear sensor and configured to obtain the landing gear signal from the landing gear sensor and further configured to command the display unit to modify the appearance of the second image when the landing gear signal is obtained.

14. The system of claim 12, wherein the processor is configured to modify the appearance of the second image when a distance from the aircraft to the runway equals a predetermined distance.

15. The system of claim 9, wherein the processor is configured to command the display unit to blank out at least a portion of the second image.

16. The system of claim 9, wherein the processor is configured to command the display unit to render at least a portion of the second image at least partially transparent.

17. The system of claim 9, wherein the processor is configured to command the display unit to diminish a brightness of at least a portion of the second image.

18. A method for displaying a first image and a second image to a pilot of an aircraft during flight, the method comprising the steps of:
receiving a light transmission originating from an exterior of the aircraft with a sensor system;
sensing a dynamic condition of the aircraft with a dynamic condition sensor;
displaying the first image corresponding with the light transmission on a display screen;
overlaying the second image corresponding with the dynamic condition of the aircraft on top of the first image; and
modifying the second image in a manner that enhances a pilot's ability to discern the first image.

19. The method of claim 18, further comprising detecting a distance of the aircraft from a runway, and wherein the modifying step is performed when the distance of the aircraft from the runway equals a predetermined distance.

20. The method of claim 18, further comprising detecting when a landing gear of the aircraft is lowered, and wherein the modifying step is performed when the landing gear is lowered.

21. A system for displaying a first image and a second image to a pilot of an aircraft during flight, the system comprising:
a synthetic vision subsystem configured to generate a first signal indicative a topographical environment proximate the aircraft;
a dynamic condition sensor configured to detect a dynamic condition of the aircraft and to generate a second signal indicative of the dynamic condition of the aircraft;
a display unit having a display screen; and
a processor communicatively coupled to the synthetic vision subsystem, to the dynamic condition sensor, and operatively coupled to the display unit, the processor configured to:
obtain the first signal and the second signal,
command the display unit to display the first image on the display screen corresponding to the first signal,
command the display unit to display the second image overlaid over the first image, the second image corresponding to the second signal, and
command the display unit to modify an appearance of the second image to enhance an ability to discern the first image.

22. The system of claim 21, wherein the second image comprises symbology.

23. The system of claim 21, wherein the processor is configured to command the display unit to blank out at least a portion of the second image.

24. The system of claim 21, wherein the processor is configured to command the display unit to render at least a portion of the second image at least partially transparent.

25. The system of claim 21, wherein the processor is configured to command the display unit to diminish a brightness of at least a portion of the second image.

* * * * *